(12) United States Patent
Borg et al.

(10) Patent No.: US 7,896,122 B2
(45) Date of Patent: Mar. 1, 2011

(54) DEVICE FOR CONTROLLING THE OPENING OF THE ENGINE HOOD OF A VEHICLE, PARTICULARLY FOR PROTECTING THE HEAD OF A PEDESTRIAN IN THE EVENT OF A COLLISION THEREWITH

(75) Inventors: Evrard Borg, Martignas sur Jalle (FR); Eric Laspesa, Saint Médard en Jalles (FR); Jean-Paul Nadeau, Ollioules (FR); Yvon Tetu, La Garenne Colombes (FR)

(73) Assignees: Renault SAS, Boulogne-Billancourt (FR); SNPE Materiaux Energetiques, Paris (FR)

( * ) Notice: Subject to any disclaimer, the term of this patent is extended or adjusted under 35 U.S.C. 154(b) by 230 days.

(21) Appl. No.: 11/916,719

(22) PCT Filed: Jun. 2, 2006

(86) PCT No.: PCT/FR2006/001255
§ 371 (c)(1),
(2), (4) Date: Dec. 6, 2007

(87) PCT Pub. No.: WO2006/131628
PCT Pub. Date: Dec. 14, 2006

(65) Prior Publication Data
US 2008/0189015 A1    Aug. 7, 2008

(30) Foreign Application Priority Data
Jun. 6, 2005    (FR) .................................... 05 05696

(51) Int. Cl.
*B60R 21/34* (2006.01)
*B62D 25/12* (2006.01)

(52) U.S. Cl. .................. 180/274; 296/187.04; 180/69.21

(58) Field of Classification Search .................. 180/274, 180/69.2, 69.21; 701/54; *B62D 25/12*
See application file for complete search history.

(56) References Cited

U.S. PATENT DOCUMENTS

| 6,345,679 | B1* | 2/2002 | Sasaki ........................... 180/274 |
| 6,439,330 | B1 | 8/2002 | Paye |
| 6,953,220 | B2* | 10/2005 | Takehara ................. 296/187.04 |
| 7,475,752 | B2* | 1/2009 | Borg et al. .................... 180/274 |
| 2004/0113459 | A1 | 6/2004 | Mattsson et al. |
| 2005/0151393 | A1* | 7/2005 | Borg et al. ................ 296/187.09 |
| 2005/0257980 | A1* | 11/2005 | Green et al. .................. 180/274 |

(Continued)

FOREIGN PATENT DOCUMENTS

DE    10116716 A1    10/2002

(Continued)

*Primary Examiner* — Eric Culbreth
*Assistant Examiner* — Drew Brown
(74) *Attorney, Agent, or Firm* — Sughrue Mion, PLLC

(57) ABSTRACT

The invention relates to a device for controlling the opening of the hood (1) of the engine compartment of a vehicle, connected to the vehicle body in a hinged manner for enabling it to partially open by rotating around the rear hinge toward the front of the vehicle from a position in which the hood (1) is latched to the vehicle body by means of at least one hook (18). This device comprises an impact detector mounted at the front of the vehicle and interacting with an actuator (19, 21) for controlling the unlatching of said hook (18) and comprises means for guiding the opening of the hood (1), these means for guiding the opening of the hood (1) comprising means for guiding the rear edge (1*a*) of the hood (1) in an essentially vertical direction.

17 Claims, 3 Drawing Sheets

U.S. PATENT DOCUMENTS

Figure 1:
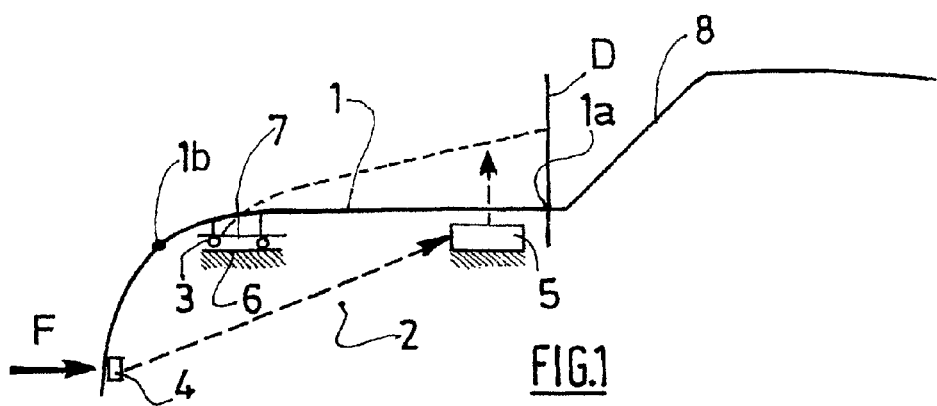

| | | | |
|---|---|---|---|
| 2007/0102219 A1* | 5/2007 | Park | 180/274 |
| 2007/0151791 A1* | 7/2007 | Gust | 180/274 |
| 2009/0050388 A1* | 2/2009 | Leong | 180/69.21 |
| 2009/0078487 A1* | 3/2009 | Borg et al. | 180/274 |

FOREIGN PATENT DOCUMENTS

| | | |
|---|---|---|
| DE | 10336584 A1 | 4/2004 |
| JP | 58221773 A | 12/1983 |

* cited by examiner

DEVICE FOR CONTROLLING THE OPENING OF THE ENGINE HOOD OF A VEHICLE, PARTICULARLY FOR PROTECTING THE HEAD OF A PEDESTRIAN IN THE EVENT OF A COLLISION THEREWITH

The present invention relates to a device for controlling the opening of the hood of a vehicle at a certain angle, from the rear to the front of the vehicle, particularly so that this hood can protect the head of a pedestrian in the event of an impact between the front of the vehicle and this pedestrian.

In this position, the rear portion of the hood is raised, so that the head of the pedestrian that has been hit does not risk colliding violently with the windshield of the vehicle, but on the contrary so that the hood comes into contact with the head of the pedestrian as high and as quickly as possible, in order thereafter to accompany it in the descent of the hood and cushion the impact to the maximum.

Accordingly, the device for controlling the partial opening of the hood may comprise an impact detector placed at the front of the vehicle interacting with an actuator to control the unlatching of the hook providing the rear latching of the hood to the bodywork of the vehicle and means for guiding the opening of the hood toward the aforementioned protective position.

A known problem of this type of device is the presence of a time lag between the unlatching of the hook and the deployment of the hood. This time for passing from a latched static situation to a dynamic situation of the hood must be reduced as much as possible so that the hood is more quickly in the high position.

A second problem to be taken into account is the position of the hood at the moment of impact with the head of the pedestrian. This impact must not take place when the hood is already redescending, when the absorption of forces would not be optimal.

The object of the present invention is to optimize such a device, for controlling the partial opening of the hood of a motor vehicle, that responds to the problems mentioned above.

Therefore the subject of the invention is a device for controlling the opening of the hood of the engine compartment of a vehicle, connected in an articulated manner to the bodywork of the vehicle to be able to open partially by rotating about the articulation from the rear to the front of the vehicle from a position in which the hood is latched to the bodywork, by means of at least one hook, this device comprising an impact detector placed at the front of the vehicle interacting with an actuator to control the unlatching of said hook and means for guiding the opening of the hood, characterized in that said means for guiding the opening of the hood include means for guiding the rear edge of the hood in a substantially vertical direction.

By providing such a substantially vertical guidance of the rear edge of the hood, the space between the latter and the windshield of the vehicle is reduced, which makes it possible to provide better protection in the event of the impact of the pedestrian.

To allow such a substantially vertical guidance of the rear of the hood, preferably the front edge of the hood is connected to the bodywork by means allowing this front edge to slide rearward when the hood is opened.

According to a preferred version of the invention, the means for guiding the opening of the hood include a movable support connected in an articulated manner to the hood and a fixed support fixed to the bodywork, these two supports being connected together in an articulated manner by a front lever and a rear lever whose articulations to said supports define a quadrilateral.

To obtain a substantially vertical movement of the rear of the hood, during its opening caused by an impact, it is naturally appropriate to clearly define the four articulation points and the sides of the deformable quadrilateral that connects the fixed support to the movable support.

Preferably, the movable support is connected in an articulated manner by its rear part to the hood along a shaft parallel to the articulation shafts of said levers.

Also preferably, said actuator controls successively the unlatching of the hook and the opening of the hood and the control of said actuator is triggered by a pyrotechnic charge.

Therefore, the hood of the vehicle may be moved to the protective position very rapidly after an impact with a pedestrian.

In a particular and effective embodiment of the invention, said actuator is a cylinder whose body is articulated to the support fixed to the bodywork, and whose rod is connected, in an articulated manner and slidingly relative to the movable support, to the hood, the end of the rod being adapted to press against said hook to move the latter toward the unlatched position relative to the bodywork.

Preferably, the cylinder rod is engaged in a bore made in a ring mounted so as to pivot in the movable support connected to the hood, said cylinder rod comprising a shoulder that can press against said ring after said cylinder is triggered.

When the hood is latched relative to the bodywork, there is a predetermined clearance, on the one hand, between the shoulder of the cylinder rod relative to the pivoting ring and, on the other hand, between the end of the rod and said hook.

These two clearances make it possible to take account of the manufacturing and assembly tolerances and, when the cylinder is triggered, to ensure that the end of the cylinder rod first comes into contact with the hook to unlatch the hood and then the shoulder of the cylinder rod butts against the pivoting ring to trigger the raising of the hood.

Preferably, the hook is fixed in a pivoting manner to the rear of the movable support connected to the hood, along a shaft parallel to the articulation shafts of said front and rear levers, this hook being able to pivot against the action of a spring between a latched position relative to a finger that is fixed relative to the bodywork and an unlatched position relative to this finger.

Also preferably, the hook comprises a convex portion directed toward the end of the cylinder rod that is conformed so that the end of this rod can slide on the convex portion when the hood opens and closes.

The control device according to the invention also comprises means for latching the hood in the partially open position, these means preferably being calculated to give way under the effect of a predetermined force applied to the hood, particularly in the case of an impact with a pedestrian.

These means make it possible on the one hand to cause the impact of the pedestrian to correspond with an optimal high position of the hood, and, on the other hand, not to generate a hard point hampering the descent of the hood after the impact and the accompaniment of the head of the pedestrian.

Figure 2:
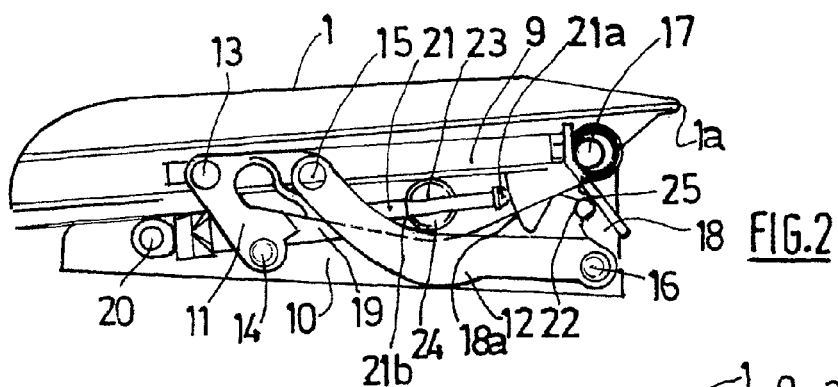
Figure 3:
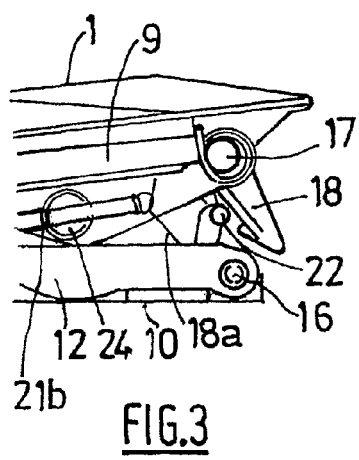
Figure 4:
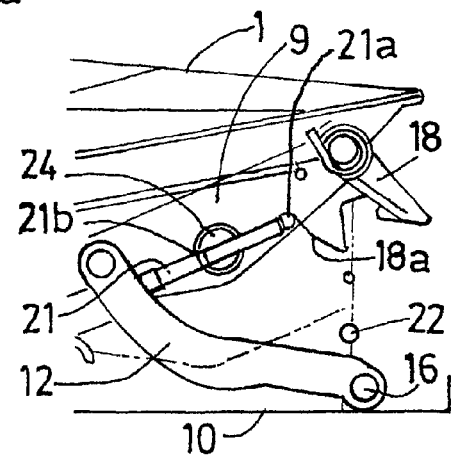
Figure 5:
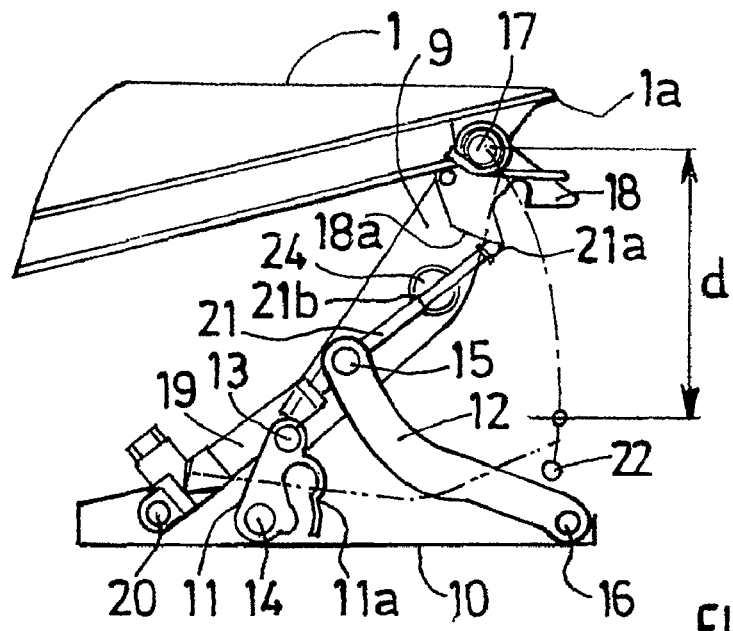
Figure 6:
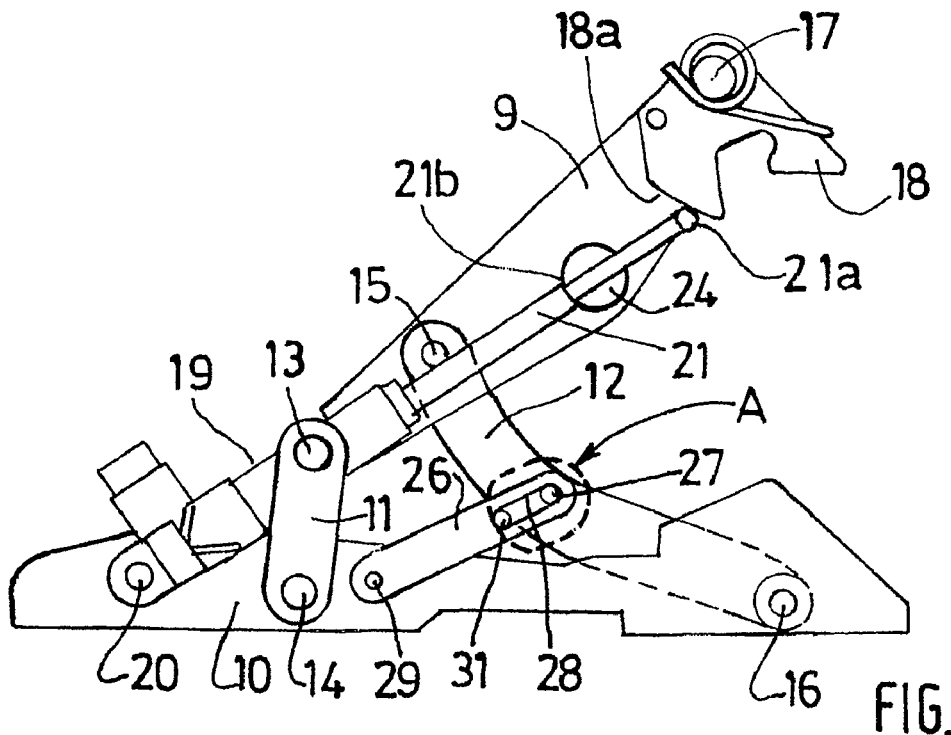
Figure 7:
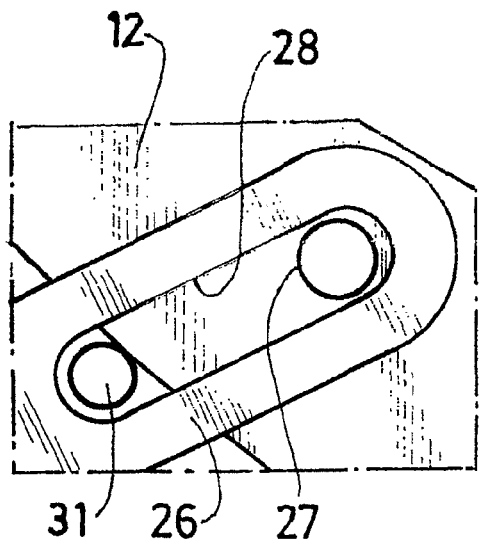
Figure 8:
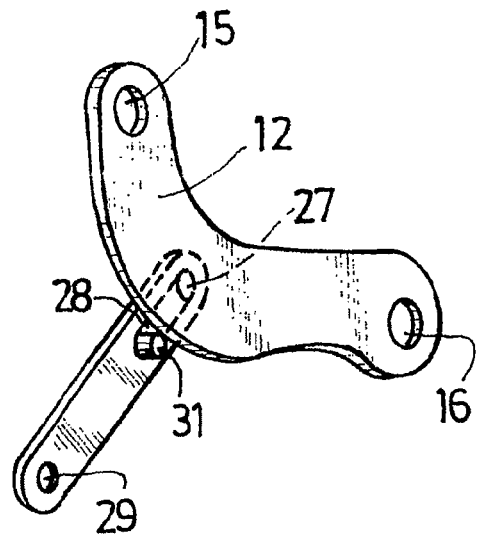
Figure 9:
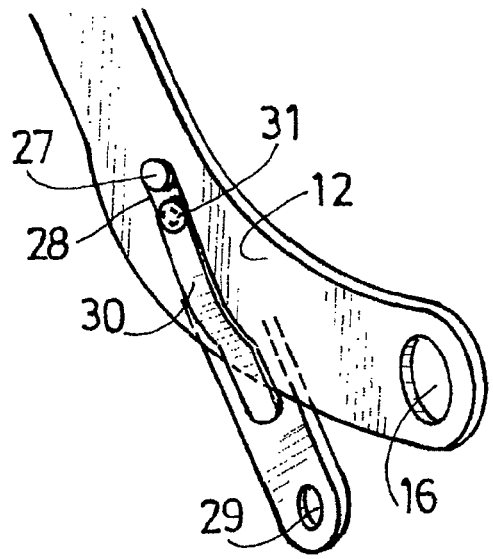

Other particular features and advantages of the invention will further appear in the following description, with reference to the appended drawings given as nonlimiting examples. In these drawings:

FIG. 1 is a diagram illustrating the device for controlling the partial opening of the hood of a vehicle in the event of an impact at the front of the latter, FIG. 2 is a side view of a control device according to the invention, the hood being closed and latched, FIG. 3 is a view similar to FIG. 2, showing the unlatching of the hook of the device, FIG. 4 is a view similar to FIG. 3, showing the beginning of the opening of the hood, FIG. 5 is a view similar to FIG. 4, showing the hood in its high position, FIG. 6 is a side view of an enhanced version of the control device in the high position, FIG. 7 is a view on a larger scale of the detail A of FIG. 6, FIG. 8 is a view in perspective of a rear lever of the device interacting with a link rod for locking the hood in the high position, FIG. 9 is another view in perspective of the lever and link rod assembly of FIG. 8.

FIG. 1 illustrates schematically a device for controlling the opening of the hood 1 of the engine compartment 2 of a vehicle, connected in an articulated manner to the bodywork of the vehicle in order to be able to open partially by rotating about an articulation 3 from the rear to the front of the vehicle from a position, shown in solid line in FIG. 1, in which the hood 1 is latched to the bodywork, by means of at least one hook (not shown in FIG. 1). The device comprises an impact detector 4 placed at the front of the vehicle interacting with an actuator 5 to control the unlatching of the aforementioned hook and means for guiding the opening of the hood 1.

According to the invention, the means for guiding the opening of the hood 1 include means for guiding the rear edge 1a of the hood 1 in a substantially vertical direction D.

Furthermore, the front edge 1b of the hood 1 is connected to the bodywork 6 by sliding means 7 allowing this front edge 1b to slide rearward when the hood 1 is opened, as shown in dashed lines in FIG. 1.

This rearward translation of the hood 1 has the effect of reducing the space lying between the rear edge 1a of the hood and the windshield 8 of the vehicle.

FIGS. 2 to 5 show in detail the means for guiding the opening of the hood 1 of a first embodiment of the invention.

These means include a movable support 9 connected in an articulated manner to the hood 1 and a fixed support 10 fixed to the bodywork of the vehicle. These two supports 9, 10 are connected together in an articulated manner by a front lever 11 and a rear lever 12 whose articulations 13, 14, 15, 16 to the supports 9, 10 define a deformable quadrilateral.

The movable support 9 is connected in an articulated manner to the hood 1 by a shaft 17 parallel to the articulation shafts 13, 14, 15, 16 of the two levers 11, 12.

The control device according to the invention comprises an actuator that controls successively the unlatching of a hook 18 and the opening of the hood 1.

To obtain a rapid triggering, the control of the above actuator is triggered by a pyrotechnic charge of the same type as that used to trigger airbags.

In the example shown in FIGS. 2 to 6, the above actuator is a cylinder whose body 19 is articulated at 20 to the support 10 fixed to the bodywork, and whose rod 21 is connected, in an articulated manner and slidingly relative to the movable support 9, to the hood 1. The end 21a of the rod 21 is adapted to press against the hook 18 to move the latter toward the unlatched position relative to a finger 22 fixed relative to the bodywork.

FIGS. 2 to 5 also show that the cylinder rod is engaged in a bore 23 made in a ring 24 mounted so as to pivot in the support 9 connected to the hood 1. This rod 21 of the cylinder comprises a shoulder 21b that can press against the ring 24 after the cylinder is triggered.

When the hood 1 is latched relative to the bodywork, as shown in FIG. 2, there is a predetermined clearance, on the one hand, between the shoulder 21b of the cylinder rod relative to the pivoting ring 24 and, on the other hand, between the end of the rod 21a and the hook 18. These clearances take account of the manufacturing and assembly tolerances and allow the cylinder rod, after the actuation of the pyrotechnic charge, to act first on the ring 24 and then on the hook 18.

As also shown in FIGS. 2 to 5, the hook 18 is fixed in a pivoting manner along the shaft 17 situated at the rear of the support 9 connected to the hood 1 and parallel to the articulation shafts 13, 14, 15, 16 of the front and rear levers 11, 12. The hook 18 can pivot against the action of a coil spring 25 between a latched position relative to the finger 22 fixedly attached to the support 10 fixed to the bodywork and an unlatched position relative to this finger 22 (see FIGS. 3, 4 and 5).

FIGS. 2 to 5 also show that the hook 18 comprises a convex front portion 18a directed toward the end 21a of the cylinder rod that is conformed so that the end 21a of this rod can slide on the convex portion 18a of the hook without escaping from the latter when the hood 1 opens and closes.

The body 19 of the cylinder is articulated to the support 10 fixed to the bodywork along a shaft 20 which, in the example shown, is situated at the front of the front lever 11 and the shaft of the pivoting ring 24 in which the cylinder rod is engaged is situated at the rear of the rear lever 12 of the device according to the invention. However, the position of the shaft of the pivoting ring 24 may be different.

The control device according to the invention also comprises means for latching the hood 1 in the partially open position, that is to say in its highest position shown in FIG. 5.

Accordingly, one of the two levers 11, 12 comprises means interacting with the support 10 fixed to the bodywork to lock the hood 1 in its aforementioned partially open position.

In the case of the example shown in FIGS. 2 to 5, the front lever 11 supports an elastic prop 11a that can rest on the fixed support 10, in the position shown in FIG. 5. This elastic prop 11a is sufficiently fragile to give way, under the effect of an impact of the head of a pedestrian on the hood in the raised position, so that the latter can lower and cushion the impact.

In the example shown in FIG. 6, the means for locking the hood 1 in a partially open position, that is to say raised position, comprise a link rod 26 connecting in an articulated manner the rear lever 12 to the support 10 fixed to the bodywork. The rear lever 12 comprises a pin 27 (see also FIGS. 7 to 9) engaged in an oblong opening 28 extending in the direction of the shaft 29 for articulating the link rod 26 to the aforementioned support 10. In addition, the link rod 26 comprises, on one of its faces (see FIG. 9), an elastic strip 30 supporting a pin 31 that is able to engage in the oblong opening 28 of the link rod 26 and form a stop for the rear lever 12 preventing it from tilting toward the support 10. Therefore, the hood 1 cannot return by itself, that is to say under the effect of its own weight, to the closed position.

Furthermore, in all cases, the hood 1 is adapted to be able to open in a conventional manner from front to rear, along an articulation shaft 17 that is common with the shaft for connection between the movable support 9 and the hood 1 and with the pivoting shaft of the latching hook 18.

In a manner not visible in the figures, the supports 9 and 10 have a U-shaped cross section that makes it possible not only to support the articulation shafts of the various components of the device according to the invention, but also to house between them these various components when the device is in the latched position shown in FIG. 2, so as to have a minimal height requirement.

Furthermore, the bottom of the support 10 fixed to the bodywork has a raised portion not shown that allows, during assembly, the cylinder to be guided into the pivoting ring 24. This raised portion above all has the after-sales advantage of making it easy to position the pyrotechnic trigger in the ring.

The general arrangement of the mechanism (shape of the hook, rod-ring interaction, articulated mechanism and latching hook, etc.) allows a reversibility of the movement, so that the hood can be repositioned in the down position if needed, for example, in the event of inadvertent triggering.

The control device that has just been described operates in the following manner:

In the event of an impact applied in the direction of the arrow F of FIG. 1 generated on impact with a pedestrian, this impact is detected by the detector 4 which controls, via a pyrotechnic charge, the triggering of the cylinders 19, 21.

The end 21a of the cylinder rod pushes the hook 18 which, by rotating about its shaft 17, places itself in the unlatched position relative to the finger 22 shown in FIG. 3.

The shoulder 21b of the cylinder rod then comes into contact with the pivoting ring 24, which causes the movable support 9 to rise and the levers 11 and 12 to tilt upward.

The hook 18 separates completely from the finger 22 (see FIG. 4), while the end 21a of the cylinder rod continues to press on the convex surface 18a of the hook against the action of the return spring 25.

When the cylinder rod reaches its maximum extension, the hood 1 reaches its maximum height represented in FIGS. 5 and 9, in which the distance d reaches for example 150 mm.

In this position, the hood 1 is capable of cushioning the shock of the head of the pedestrian.

In this position, the inclination of the hood 1 is also maintained by the locking means formed by the flexible tongue 11a, in the case of FIGS. 2 to 5, and by the link rod 26 and elastic strip 30 assembly shown in FIGS. 6 to 9.

To return the hood 1 to the normal latched position, it is sufficient, in the case of FIGS. 6 to 9, to push on the pin 31 so that it disengages laterally from its stop position relative to the lever 12 to release the whole mechanism.

In a preferred version of the invention, the tongue 11a, in the case of the device shown in FIGS. 2 to 5, and the pin 31 of the version shown in FIGS. 6 to 9, are calculated to give way when the hood 1 is in the raised position represented in FIGS. 5 and 6, under the effect of a predetermined force applied to the hood 1, in the event of impact with the head of a pedestrian in order to attenuate the effects of this impact.

Therefore, in the event of an impact with the head of a pedestrian, the tongue 11a or the pin 31 above give way, so that the hood lowers accompanying the head of the pedestrian, thereby cushioning the effect of the impact.

The invention claimed is:

1. A device for controlling the opening of a hood (1) of an engine compartment of a vehicle, the hood connected in an articulated manner to bodywork of the vehicle and able to open partially, by rotating about the articulation, from a rear to a front of the vehicle from a position in which the hood (1) is latched to the bodywork by at least one hook (18), the device comprising:
    an impact detector (4) placed at the front of the vehicle;
    an actuator (5, 19, 21) to control the unlatching of said hook (18), the actuator provided to interact with the impact detector; and
    means for guiding the opening of the hood (1), wherein said means for guiding the opening of the hood (1) slides a front edge (1b) of the hood (1) in a rearward direction and guides a rear edge (1a) of the hood (1) in a substantially vertical direction (D), such that the opening of the hood (1) is a combination of a rearward movement and a rotating movement.

2. The control device as claimed in claim 1, wherein the front edge (1b) of the hood (1) is connected to the bodywork by means (7) for allowing the front edge (1b) to slide in the rearward direction when the hood (1) is opened.

3. The control device as claimed in claim 1, wherein the means for guiding the opening of the hood (1) include a movable support (9) connected in an articulated manner to the hood and a fixed support (10) fixed to the bodywork, the movable support (9) and the fixed support (10) being connected together in an articulated manner by a front lever (11) and a rear lever (12) whose respective articulations (13, 14, 15, 16) to the movable support (9) and the fixed support (10) define a quadrilateral, wherein the front lever (11) and the rear lever (12) are arranged so as to rotate rearward when the hood (1) is opened from the rear to the front of the vehicle.

4. The control device as claimed in claim 3, wherein the movable support (9) is connected in an articulated manner to the hood by a shaft (17) parallel to the articulation shafts of the front lever (11) and the rear lever (12).

5. The control device as claimed in claim 1, wherein said actuator (5, 19, 21) controls successively the unlatching of the hook (18) and the opening of the hood (1).

6. The control device as claimed in claim 1, wherein the control of said actuator (5, 19, 21) is triggered by a pyrotechnic charge.

7. A device for controlling the opening of a hood (1) of an engine compartment of a vehicle, the hood connected in an articulated manner to bodywork of the vehicle and able to open partially, by rotating about the articulation, from a rear to a front of the vehicle from a position in which the hood (1) is latched to the bodywork by at least one hook (18), the device comprising:
    an impact detector (4) placed at the front of the vehicle;
    an actuator (5, 19, 21) to control the unlatching of said hook (18), the actuator provided to interact with the impact detector; and
    means for guiding the opening of the hood (1), wherein said means for guiding the opening of the hood (1) guides a rear edge (1a) of the hood (1) in a substantially vertical direction (D),
    wherein the means for guiding the opening of the hood (1) include a movable support (9) connected in an articulated manner to the hood and a fixed support (10) fixed to the bodywork, the movable support (9) and the fixed support (10) being connected together in an articulated manner by a front lever (11) and a rear lever (12) whose respective articulations (13, 14, 15, 16) to the movable support (9) and the fixed support (10) define a quadrilateral, and
    wherein said actuator is a cylinder whose body (19) is articulated to the fixed support (10) and a rod (21) of the cylinder is connected, in an articulated manner and slidingly relative to the movable support (9), to the hood, the end of the rod (21) being adapted to press against said hook (18) to move the hook (18) toward the unlatched position relative to the bodywork.

8. The control device as claimed in claim 7, wherein the cylinder rod is engaged in a bore (23) made in a ring (24) mounted so as to pivot in the movable support (9) connected to the hood (1), said cylinder rod comprising a shoulder (21b) that presses against said ring (24) after said cylinder is triggered.

9. The control device as claimed in claim 8, wherein, when the hood (1) is latched relative to the bodywork, there is a predetermined clearance between the shoulder (21b) of the cylinder rod relative to the pivoting ring (24) and, a predetermined clearance between the end of the rod (21a) and said hook (18).

10. The control device as claimed in claim 9, wherein said hook (18) comprises a convex portion (18a) directed toward the end (21a) of the cylinder rod that is conformed so that the end (21a) of the cylinder rod can slide on the convex portion (18a) when the hood (1) opens and closes.

11. The control device as claimed in claim 9, wherein the hood (1) is also adapted to be able to open in a conventional manner from front to rear, along an articulation shaft (17) that is common with the shaft for connection between the movable support (9) and the hood (1) and with the pivoting shaft of said hook (18).

12. The control device as claimed in claim 7, wherein the body (19) of the cylinder is articulated to the fixed support (10) along a shaft (20) situated at the front of said front lever (11) and the articulation shaft (24) of the rod relative to the movable support (9) connected to the hood is situated at the rear of said rear lever (12).

13. A device for controlling the opening of a hood (1) of an engine compartment of a vehicle, the hood connected in an articulated manner to bodywork of the vehicle and able to open partially, by rotating about the articulation, from a rear to a front of the vehicle from a position in which the hood (1) is latched to the bodywork by at least one hook (18), the device comprising:
    an impact detector (4) placed at the front of the vehicle;
    an actuator (5, 19, 21) to control the unlatching of said hook (18), the actuator provided to interact with the impact detector; and
    means for guiding the opening of the hood (1), wherein said means for guiding the opening of the hood (1) guides a rear edge (1a) of the hood (1) in a substantially vertical direction (D),
    wherein the means for guiding the opening of the hood (1) include a movable support (9) connected in an articulated manner to the hood and a fixed support (10) fixed to the bodywork, the movable support (9) and the fixed support (10) being connected together in an articulated manner by a front lever (11) and a rear lever (12) whose respective articulations (13, 14, 15, 16) to the movable support (9) and the fixed support (10) define a quadrilateral, and
    wherein said hook (18) is fixed in a pivoting manner to the rear of the movable support (9) connected to the hood, along a shaft (17) parallel to the articulation shafts of said front and rear levers (11, 12), said hook (18) being able to pivot against the action of a spring (25) between a latched position relative to a finger (22) that is fixed relative to the bodywork and an unlatched position relative to said finger (22).

14. A device for controlling the opening of a hood (1) of an engine compartment of a vehicle, the hood connected in an articulated manner to bodywork of the vehicle and able to open partially, by rotating about the articulation, from a rear to a front of the vehicle from a position in which the hood (1) is latched to the bodywork by at least one hook (18), the device comprising:
    an impact detector (4) placed at the front of the vehicle;
    an actuator (5, 19, 21) to control the unlatching of said hook (18), the actuator provided to interact with the impact detector;
    means for guiding the opening of the hood (1), wherein said means for guiding the opening of the hood (1) guides a rear edge (1a) of the hood (1) in a substantially vertical direction (D); and
    means for latching the hood (1) in the partially open position.

15. The control device as claimed in claim 14, wherein the means for latching the hood (1) in the partially open position are configured to give way under the effect of a predetermined force applied to the hood, particularly in the case of an impact with a pedestrian.

16. A device for controlling the opening of a hood (1) of an engine compartment of a vehicle, the hood connected in an articulated manner to bodywork of the vehicle and able to open partially, by rotating about the articulation, from a rear to a front of the vehicle from a position in which the hood (1) is latched to the bodywork by at least one hook (18), the device comprising:
    an impact detector (4) placed at the front of the vehicle;
    an actuator (5, 19, 21) to control the unlatching of said hook (18), the actuator provided to interact with the impact detector; and
    means for guiding the opening of the hood (1), wherein said means for guiding the opening of the hood (1) guides a rear edge (1a) of the hood (1) in a substantially vertical direction (D),
    wherein the means for guiding the opening of the hood (1) include a movable support (9) connected in an articulated manner to the hood and a fixed support (10) fixed to the bodywork, the movable support (9) and the fixed support (10) being connected together in an articulated manner by a front lever (11) and a rear lever (12) whose respective articulations (13, 14, 15, 16) to the movable support (9) and the fixed support (10) define a quadrilateral, and
    wherein one of the front lever (11) and the rear lever (12) comprise means for interacting with the fixed support (10) to lock the hood (1) in the partially open position.

17. The control device as claimed in claim 16, wherein the means for locking the hood (1) in a partially open position comprise a link rod (26) connecting in an articulated manner the rear lever (12) to the fixed support (10), the rear lever (12) comprising a pin (27) engaged in an oblong opening (28) extending in the direction of the shaft (29) for articulating the link rod (26) to the fixed support (10), the link rod (26) comprising an elastic strip (30) supporting a pin (31) that is able to engage in the oblong opening (28) of the link rod (26) and form a stop for the rear lever (12) preventing it from tilting toward the fixed support (10).

* * * * *